United States Patent
Shimizu et al.

(10) Patent No.: US 7,170,705 B2
(45) Date of Patent: Jan. 30, 2007

(54) RECORDING DEVICE AND CONTROLLER AND CONTROL METHOD FOR A RECORDING DEVICE

(75) Inventors: Masahiro Shimizu, Yamato (JP); Nobuyuki Kitazaki, Chigasaki (JP)

(73) Assignee: Hitachi Global Storage Technologies, Amsterdam (NL)

( * ) Notice: Subject to any disclaimer, the term of this patent is extended or adjusted under 35 U.S.C. 154(b) by 0 days.

(21) Appl. No.: 10/250,755

(22) PCT Filed: Dec. 24, 2001

(86) PCT No.: PCT/GB01/05770

§ 371 (c)(1),
(2), (4) Date: Nov. 18, 2003

(87) PCT Pub. No.: WO02/054400

PCT Pub. Date: Jul. 11, 2002

(65) Prior Publication Data
US 2004/0075929 A1 Apr. 22, 2004

(30) Foreign Application Priority Data
Jan. 4, 2001 (JP) .............................. 2001-000124

(51) Int. Cl.
G11B 19/04 (2006.01)
G11B 21/02 (2006.01)

(52) U.S. Cl. ......................................... 360/60; 360/75

(58) Field of Classification Search ................... 360/6, 360/25, 60, 69, 75
See application file for complete search history.

(56) References Cited

U.S. PATENT DOCUMENTS 3,875,387 A * 4/1975 Bostic ........................... 377/8
5,278,572 A * 1/1994 Harada et al. .............. 343/715

(Continued)

FOREIGN PATENT DOCUMENTS

JP     58-41584     10/1983

(Continued)

OTHER PUBLICATIONS

Muramoto, Ishii, Itoh. Characteristics of a Small Planar Loop Antenna. IEEE Transactions on Antennas and Propogation. Dec. 1997. vol. 45, No. 12. pp. 1818-1822.*

(Continued)

Primary Examiner—W. R. Young
Assistant Examiner—Adam R. Giesy
(74) Attorney, Agent, or Firm—Kunzler & Associates

(57) ABSTRACT

A process, apparatus, and system are disclosed for inhibiting erroneous control signals due to disruptive electromagnetic signals. In one embodiment, the invention prevents erroneous information writing in a recording device under the effect of background electromagnetic waves. A conductor pattern is formed on a printed wiring board on which wiring constituting a control circuit of a hard disk drive is formed. Background electromagnetic waves are detected by an electromagnetic wave detection circuit. In the case where an electromagnetic wave signal detected by the electromagnetic wave detection circuit exceeds a predetermined power, voltage, or current threshold, a write gate signal is turned off to inhibit a potential write operation.

20 Claims, 9 Drawing Sheets

U.S. PATENT DOCUMENTS

| | | | | |
|---|---|---|---|---|
| 5,365,391 | A | * | 11/1994 | Sugiyama et al. ........... 360/110 |
| 5,654,847 | A | | 8/1997 | Yagi et al. ................ 360/97.02 |
| 6,122,486 | A | * | 9/2000 | Tanaka et al. ................. 455/68 |
| 6,263,288 | B1 | * | 7/2001 | Bryant ......................... 702/57 |
| 6,657,805 | B2 | * | 12/2003 | Nishida et al. ................ 360/60 |
| 2003/0210488 | A1 | * | 11/2003 | Ottesen et al. ................. 360/46 |

FOREIGN PATENT DOCUMENTS

| | | | |
|---|---|---|---|
| JP | 02-224688 | | 9/1990 |
| JP | 02-268786 | | 11/1990 |
| JP | 03-121525 | | 5/1991 |
| JP | 03-242866 | | 10/1991 |
| JP | 3242486 A2 | | 10/1991 |
| JP | 03242866 A | * | 10/1991 |
| JP | 02-131487 | | 7/1999 |
| JP | 11-039822 | | 12/1999 |
| JP | 2002100141 | | 4/2002 |
| KR | 100 214 579 | | 7/1995 |

OTHER PUBLICATIONS

M. Asai et al., "Analysis of the Microstrip Square Loop Antennas", Transactions of the Institute of Electronics, Information, and Communication Engineers. B, vol. J71-B, No. 11, p. 1376-1377, Nov. 25, 1988.

M. Haneishi et al., "A Consideration on Miniaturization of Microstrip Antenna", Transactions of the Institute of Electronics, Information, and Communication Engineers. B, vol. J71-B, No. 11, p. 1378-1380, Nov. 25, 1988.

M. Haneishi et al., "A Construction of Triplate-Type Linearly Polarized Planar Antenna", Transactions of the Institute of Electronics, Information, and Communication Engineers. B, vol. J71-B, No. 11, p. 1381-1382, Nov. 25, 1988.

M. Haneishi et al., "A Construction of Triplate-Type Linearly Polarized Planar Antenna", Transactions of the the Institute of Electronics, Information, and Communication Engineers. B, vol. J71-B, No. 11, p. 1383-1385, Nov. 25, 1988.

M. Haneishi et al., "An Easy Calculation Method of the Microstrip Antenna (MSA) Directivity", Transactions of the Institute of Electronics, Information, and Communication Engineers. B, vol. J71-B, No. 11, p. 1394, Nov. 25, 1988.

K. Itoh and T. Teshirogi, "Thin Antenna Technology", Transactions of the Institute of Electronics, Information, and Communication Engineers. B, vol. J71-B, No. 11, p. 1217-1227, Nov. 25, 1988.

* cited by examiner

RECORDING DEVICE AND CONTROLLER AND CONTROL METHOD FOR A RECORDING DEVICE

BACKGROUND OF THE INVENTION

1. Field of the Invention

The present invention relates to an electronic recording device, such as a hard disk drive, and in particular relates to reducing or preventing malfunctions of such a device that may arise from electromagnetic noise. The invention is a nationalization of PCT Application No. PCT/GB01/05770, filed on Dec. 24, 2001 claiming priority to Japan Patent Application 2001-000124, filed on Jan. 4, 2001.

2. Description of the Related Art

As is well known, feedback control can be used for head positioning in a rotary recording device, such as a hard disk drive, in which a recording medium is rotationally driven. To be more specific, positional information (servo pattern) recorded on the recording medium in advance is read from a head to identify a current position. A hard disk controller feeds back a deviation between a target address (target position) and the current position to a servo controller, which calculates driving currents to be inputted to a voice coil motor in order to eliminate the deviation. The voice coil motor drives an arm, according to the inputted driving currents, to change the position of the read/write head that is located at the end of the arm. If such a feedback loop functions properly, then the head is moved to the target position (target address). After moving the head to the target track (or a cylinder), reading or writing information via the head is enabled.

If the head receives a disturbance, such as an external impact, before being positioned to follow the target track, a normally functioning servo system detects the disturbance to automatically control the head position. However, if the head follows the target track and receives a disturbance, such as an external impact, immediately after reading or writing is enabled, reading or writing is performed in a state where the head is off the track (off-track state). In the case of a read operation, the head may fail to read and so the read operation may be performed again.

However, things are not simple in the case of writing. To be more specific, information may be written on the disk somewhere other than on the target track on which it was intended to be written. For example, the information may be written in an intermediate region to an adjacent track or written onto the adjacent track in a superimposing manner. Writing to the adjacent track in a superimposing manner is unacceptable since it eliminates original data of the adjacent track. In addition, writing data to the intermediate region makes it difficult to read and potentially leads to reading errors later.

In recent years, information processing terminals having a communication function represented by a portable telephone and a personal digital assistant have become widespread. In these apparatuses, electromagnetic waves are radiated from the apparatuses when in use. Frequencies of the radiated electromagnetic waves are often in the band 800 MHz to 1.5 GHz, or higher frequencies. The frequencies handled in recent years tend to be increasing in accordance with increases in quantity of handled information content and increases in the number of users.

According to experiments and reviews by the present inventors, there are cases where, due to an effect of high frequency and high field electromagnetic waves radiated from these apparatuses, the head positioning on the aforementioned write operation becomes unstable enough to write the information off the desired track. Related to this problem is the trend in recent years towards decreasing track width and the need for high-precision head position control for higher recording density of hard disk drives. Given the increasing storage density and decreasing track widths, the effect of electromagnetic waves on the head position control may cause a greater disturbance during read and write activities.

The electromagnetic waves are believed to induce high frequency signals on a circuit pattern and wiring of a servo control system. These induced high frequency signals adversely effect the servo system. The interaction between high frequency devices and off-track writing errors may lead to a situation where, for example, if a user is operating a personal computer while talking by a portable telephone, information stored in the hard disk drive is unintentionally erased.

It is theoretically possible, by making an electromagnetic wave shield of the hard disk drive perfect, to prevent the above-mentioned unstableness of the head positioning by electromagnetic waves. However, a perfect electromagnetic wave shield is difficult to implement in reality, as well as in terms of the costs involved.

In addition, personal computers and the like often have their cabinets shielded by conductive paint. However, it has been found that, if a ground is not completely established, the shield may actually function instead like a radiation antenna and may emit secondary radiation therefrom, causing the above-mentioned problem.

The write operation errors caused by the electromagnetic waves in the off-track state can also occur in writable rotary recording devices other than a hard disk drive. To be more specific, it also occurs in a writable optical or optical magnetic storage such as CD-R/W, DVD, and MO storage devices, and so on. Moreover, similar things occur in control of robotic arms and other equipment that may require precise movement.

What is needed is a process, apparatus, and system that for inhibiting erroneous control signals due to disruptive electromagnetic signals. Beneficially, such a process, apparatus, and system would specifically prevent erroneous information writing in a recording device under the effect of background electromagnetic waves. The process, system, and apparatus would also adapt to existing equipment with minimal or no modification.

BRIEF SUMMARY OF THE INVENTION

The present invention has been developed in response to the present state of the art, and in particular, in response to the problems and needs in the art that have not yet been fully solved by currently available disruptive signal suppression systems. Accordingly, the present invention has been developed to provide a process, apparatus, and system for inhibiting erroneous control signals due to disruptive electromagnetic signals that overcome many or all of the above-discussed shortcomings in the art.

According to a first aspect of the invention, there is provided a recording device having detection module for detecting electromagnetic waves that are expected to have an effect on positioning of an information writing apparatus. When such electromagnetic waves are detected by the above described detection module, write operations from the information writing apparatus to a recording medium are intentionally interrupted. As this configuration inhibits write operation in the case where the electromagnetic waves would have an adverse effect, the invention can prevent the electromagnetic waves from causing writing in an off-track state so as to avoid a situation where information recorded on the recording medium, such as a hard disk drive, is unintentionally erased.

According to one embodiment of the present invention, there is provided a technology capable of achieving superior recording reliability even under the disruptive effect of high frequency electromagnetic waves. To be more specific, the invention can mitigate or prevent the problem of off-track writing under the disruptive effect of high frequency electromagnetic waves by inhibiting the write processing during the time that the write processing would otherwise occur. In addition, the invention provides a technology for preventing the occurrence of an accidental movement when positioning of a robotic arm or other controlled apparatus becomes unstable due to disruptive high frequency electromagnetic waves.

Another embodiment of the present invention can be described as follows. A rotary recording device comprises a rotary recording medium for recording information, a writing module for writing information to the rotary recording medium, a detection module for detecting electromagnetic waves, and a write gate module for, in the case where the strength of the electromagnetic waves detected by the detection module exceeds a predetermined threshold, inhibiting writing of the information to the rotary recording medium.

The detection module may be placed close to a control circuit for controlling the rotary recording device or in an enclosure covering the rotary recording device. Also, the detection may include a conductor pattern on a printed wiring board or an antenna provided for the enclosure. Moreover, the conductor pattern preferably comprises a linear region and an area region connected to one end of the linear region, the area region having a shape of a square, a rectangle, a comb, a circle, a doughnut, or the like, and a width larger than that of the linear region. In addition, the conductor pattern may be surrounded by a ground pattern of the printed wiring board formed in the same layer as the above described conductor pattern, the ground pattern capable of covering the wiring included in the control circuit formed in another layer of the printed wiring board.

Another aspect of the invention provides a control method for a recording device, and in addition the invention is applicable to a mechanism or a method of suppressing a control failure of an operation controller arising from high frequency electromagnetic waves.

The present invention, according to the disclosed embodiments, achieves several advantageous effects. A rotary recording device having superior recording reliability even under the effect of high frequency electromagnetic waves can be achieved. In particular, the invention provides a technology capable of inhibiting off-track write operation under the effect of electromagnetic waves. In addition, the invention may prevent a robotic arm or other controlled apparatus from working in an incorrect position due to interference of the electromagnetic waves.

One aspect of the invention is a controller for controlling a data processing or read/write operation. The controller, in one embodiment, includes a detector for detecting electromagnetic waves and a unit for inhibiting said operation if the strength of the electromagnetic waves detected by said detector exceeds a predetermined threshold. In on embodiment, the detector for detecting electromagnetic waves includes a conductor pattern of a printed wiring board on which wiring included in the control circuit of said controller is formed, or an antenna provided for an enclosure of said controller.

Another aspect of the invention is a control method, including controlling operation of a controller by using a feedback system such as a servo system, determining whether or not the strength of electromagnetic waves detected by a detector for detecting the same is at or lower than a predetermined threshold, and stopping operation of the controller, if the result of the determination is false.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
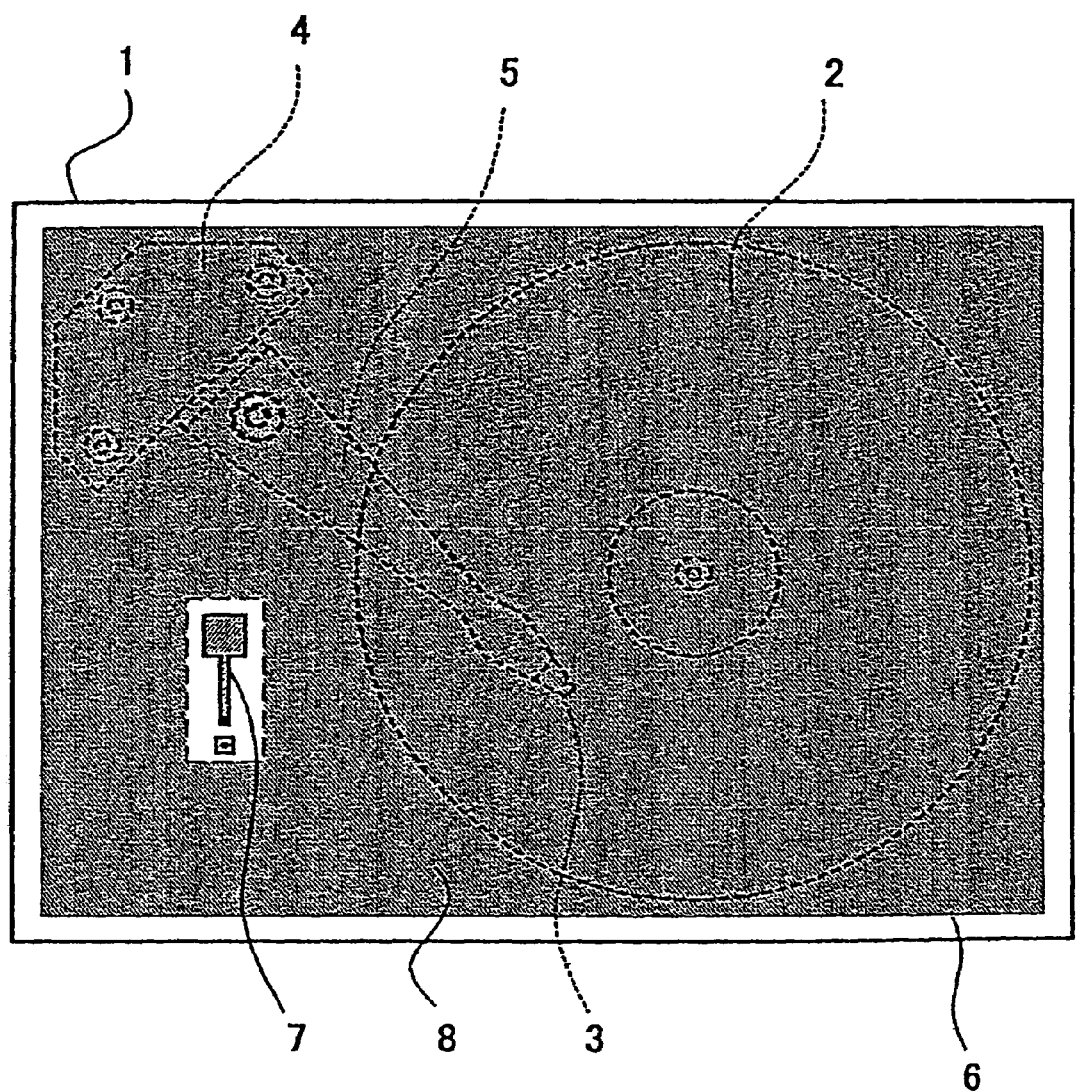
FIG. 1 is a schematic diagram illustrating a top view showing one embodiment of a hard disk drive according to the present invention.
Figure 2:
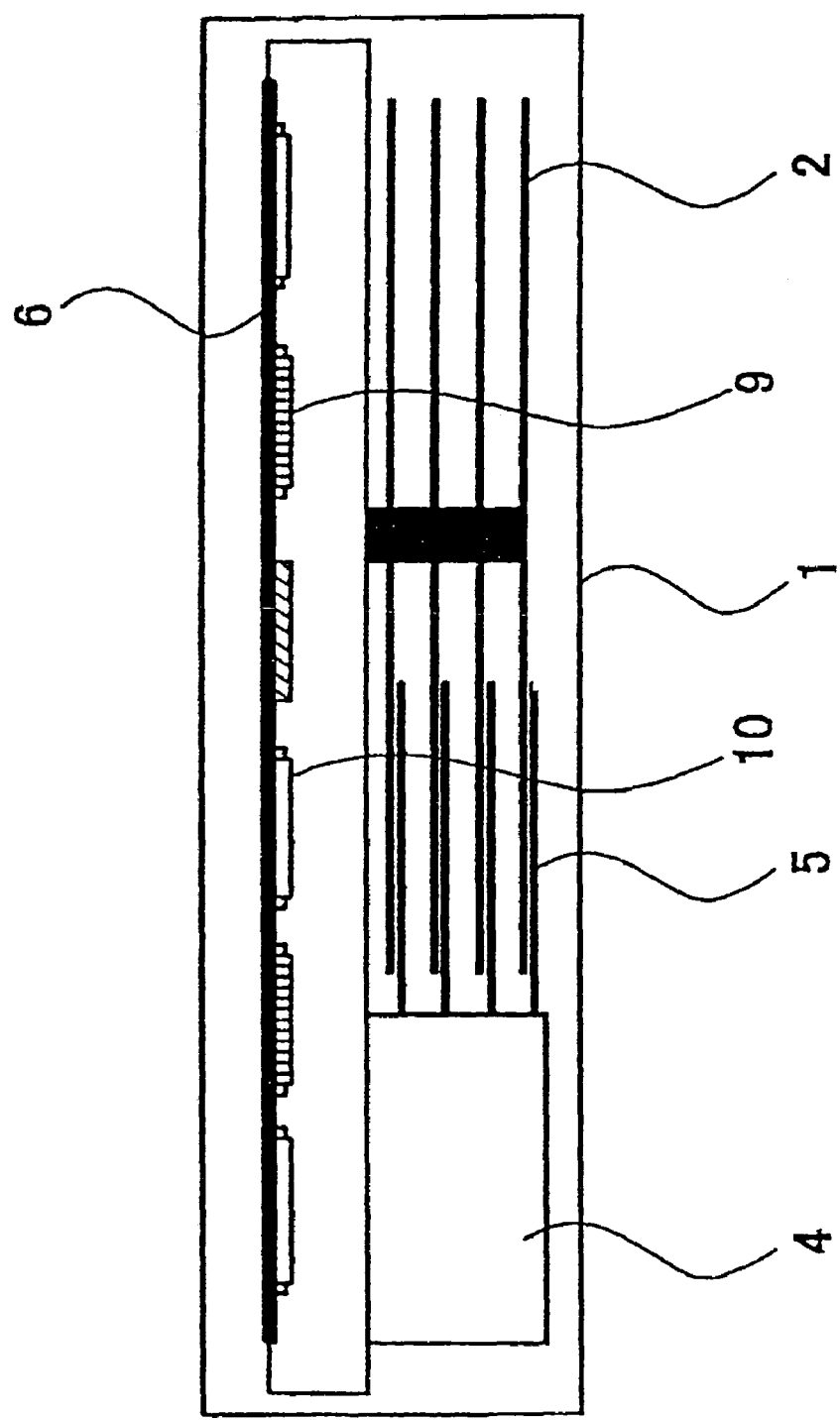
FIG. 2 is a schematic diagram illustrating a cross-sectional view, viewed from the side, of one embodiment of the hard disk drive of FIG. 1 according to the present invention.

FIGS. 1 and 2 are views showing one embodiment of a hard disk drive that may be a representative electronic storage device of the present invention. FIG. 1 is a top view of a hard disk drive. FIG. 2 is a cross-sectional view of the hard disk drive of FIG. 1, viewed from the side. The depicted hard disk drive 1 comprises a rotary magnetic recording medium 2, a magnetic head 3, a drive 4, an arm 5 and a printed wiring board 6.

The magnetic recording medium 2 is, in one embodiment, rotationally driven by a spindle motor, for instance, and information is recorded on the magnetic recording medium 2 by utilizing magnetic action. The information recorded on the magnetic recording medium 2 is read by the magnetic head 3 and the information is also recorded by the magnetic action from the magnetic head 3. In addition, the magnetic recording medium 2 has positional information (servo pattern) written thereon in advance that is utilized to control a relative position of the magnetic head 3 to the magnetic recording medium 2. In one embodiment of the invention, the magnetic head 3 is a GMR (giant magneto resistive) element whose resistance value changes due to magnetic action is used.

The drive 4 connects to and drives one end of the arm 5 in a substantially radial direction relative to the magnetic recording medium 2. For instance, in one embodiment, the drive 4 is a voice coil motor (VCM). The magnetic head 3 is located at or near the end of the arm 5 and the position of the magnetic head 3 is controlled by driving the arm and head, via the drive 4, in the radial direction of the magnetic recording medium 2.

On the face of the printed wiring board 6, a conductor pattern 7 functioning as an electromagnetic wave sensor may be formed and other wiring patterns are also formed. Wiring patterns are formed in a wiring region 8. The printed wiring board 6 is configured, in one embodiment, as a multilayer printed wiring board having wiring formed not only on the face but also on the backside and in an intermediate layer. On the backside of the printed wiring board 6, a hard disk controller for controlling the hard disk drive 1, a MPU, a LSI element 9 such as a memory, a resistive element, and a passive element 10 such as a condenser are mounted. Moreover, it is a matter of course that elements may be mounted on the face of the printed wiring board 6.

Assuming that disruptive electromagnetic waves are not generated within the hard disk drive 1, the conductor pattern 7 functions as an antenna for detecting electromagnetic waves from outside the electronic recording device, such as a disturbance wave emitting from a portable telephone. The conductor pattern 7 is preferably close to a servo control circuit, that is, preferably placed in a direction of the incoming disturbance wave, which is on the top face of the hard disk drive 1 (the face reverse to the opposite face to the magnetic recording medium 2) in the embodiment depicted in FIGS. 1 and 2.

Preferably, the conductor pattern 7 is located for the purpose of detecting the disturbance wave with higher sensitivity. However, the direction of placement of the conductor pattern 7 is not specifically limited. So long as the conductor pattern 7 can detect a disturbance wave, it may be formed on the backside of the printed wiring board or on a board placed separately from the printed wiring board 6 and is not limited to the face of the printed wiring board 6. Moreover, the above description is on the precondition that, when installing the hard disk drive 1 on a computer system, the conductor pattern 7 should be on the topside, that is, the hard disk drive 1 should be installed sideways so as to have the face of the printed wiring board 6 on the topside.

As the hard disk drive 1 may be installed lengthwise or in an arbitrary direction, the expressions of "topside," "face" and "backside" in the foregoing description are relative expressions depending on the orientation of the board while in use and relative to a device that might generate a disruptive electromagnetic signal. In short, it is sufficient to have the conductor pattern 7 placed in a position where the disturbance wave can be easily received, with no limitation to its direction and position of placement.

Figure 3:
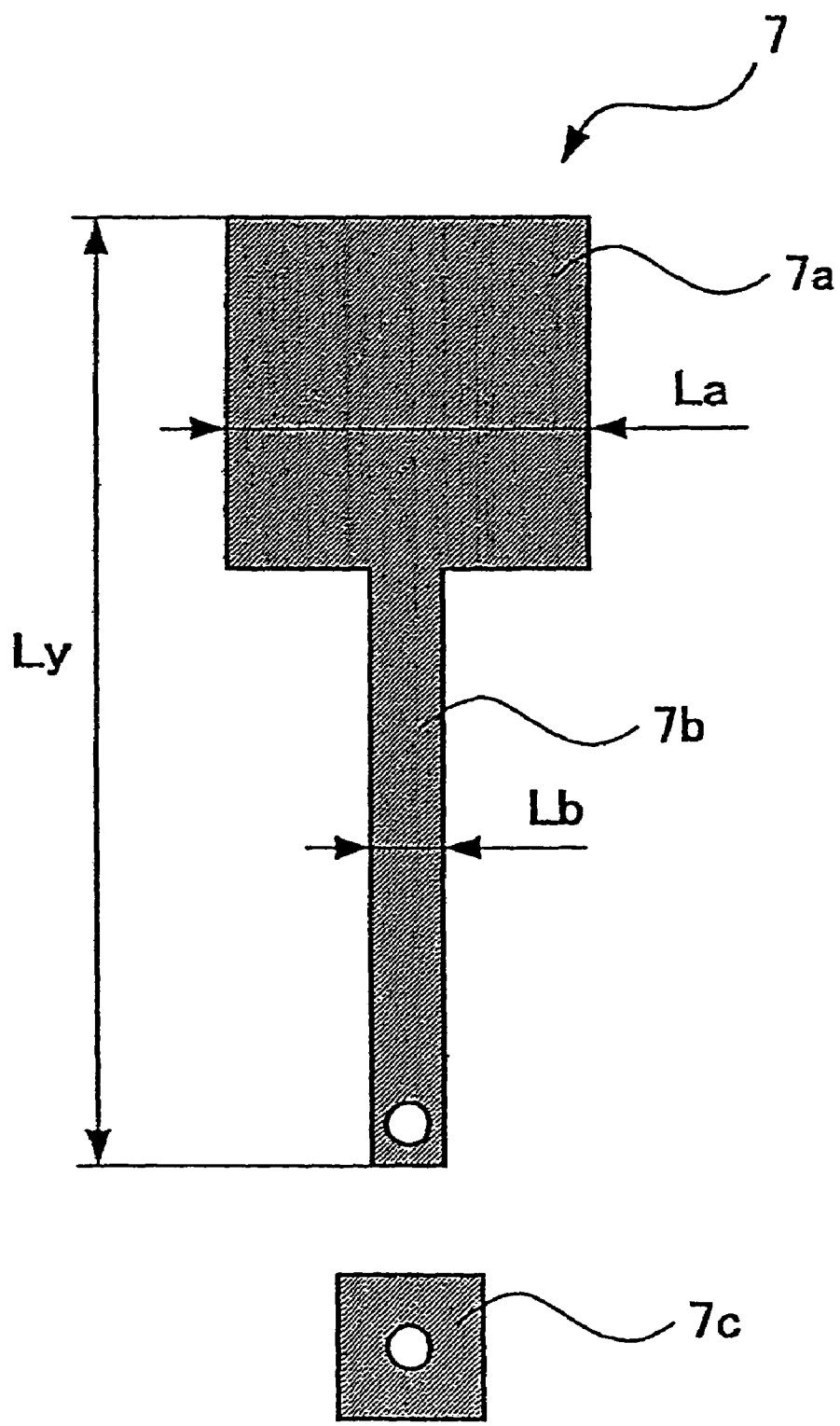
FIG. 3 is a schematic diagram illustrating a plan view of one embodiment of a conductor pattern according to the present invention.

FIG. 3 is a plan view showing an example of a conductor pattern 7. The conductor pattern 7 of this embodiment is comprised of an area portion 7a and a linear portion 7b. The depicted conductor pattern 7 is configured so that the width, La, of the area portion 7a is larger than width, Lb, of the linear portion 7b. In addition, the length, Ly, including both the area portion 7a and the linear portion 7b, is approximately one wavelength (or a ½ wavelength or a ¼ wavelength) of an electromagnetic wave. For instance, in the case of detecting a wave of a carrier (800 MHz or 1.5 GHz) of a portable telephone, Ly should preferably be 15 mm or so.

It is thus possible, by providing the area portion 7a, to effectively capture disturbance electromagnetic waves of various frequencies. While it is also possible, of course, to configure Ly to be a ½ wavelength of the wave to be detected like a dipole antenna, a phenomenon of producing strong resonance to a specific wavelength is not expected in the conductor pattern 7 of this embodiment. Thus, a detection band for the wave to be detected can be wide. In addition, as the size of the conductor pattern 7 of this embodiment is very small, it can be placed easily together with already designed wiring on an existing printed wiring board 6.

Moreover, an additional portion 7c of the conductor pattern 7 may provide grounding potential. It is possible to detect the strength of the disturbance wave by detecting the potential between the end of the linear portion 7b and the additional portion 7c. It is not especially required to provide the additional portion 7c and the potential of the conductor pattern 7 may be detected with reference to the wiring on the printed wiring board 6 for providing an arbitrary grounding potential.

Figure 4:
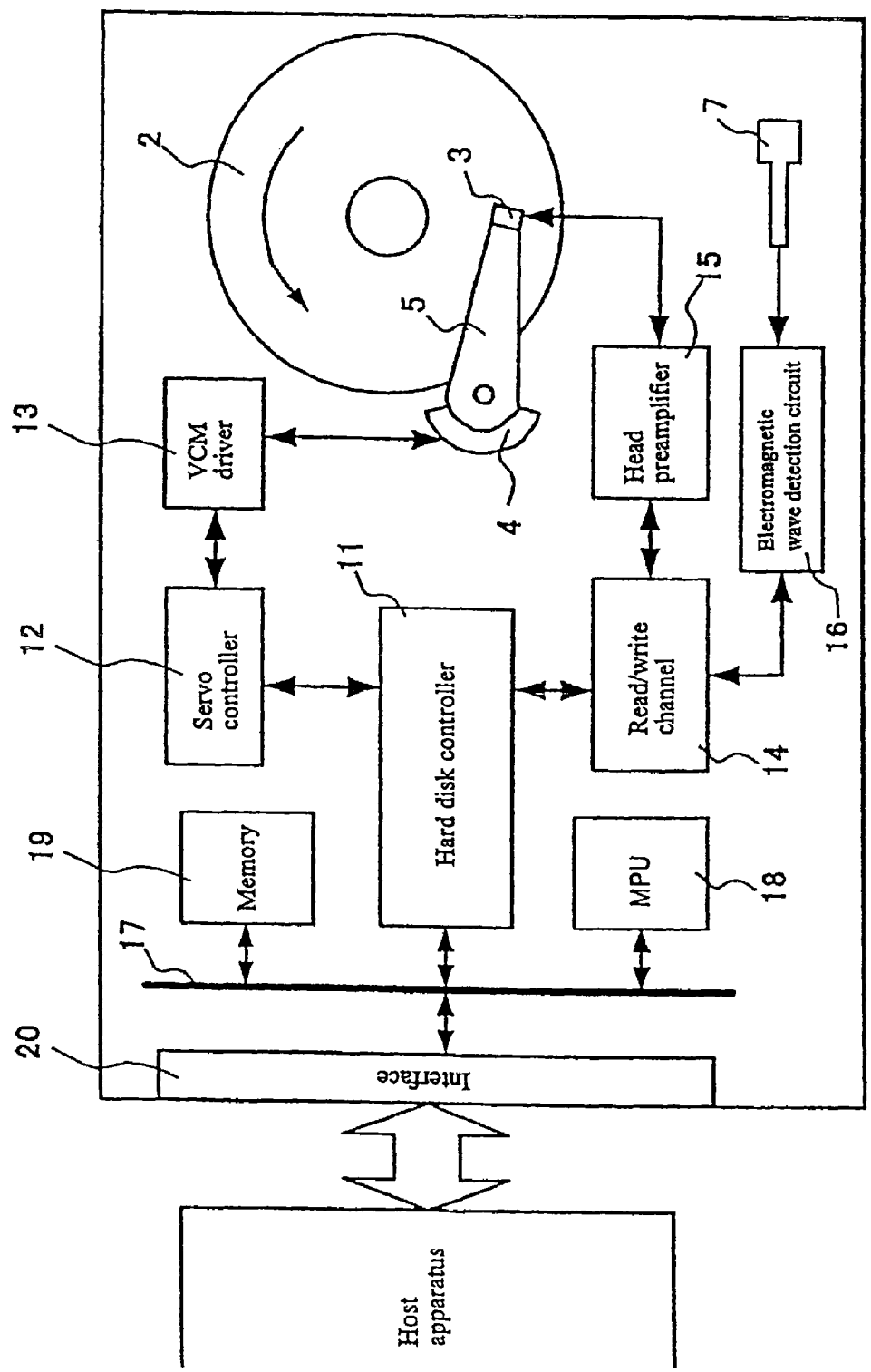
FIG. 4 is a schematic block diagram illustrating one embodiment of a hard disk drive according to the present invention.

FIG. 4 is a block diagram for explaining functions of one embodiment of the hard disk drive 1. The hard disk drive 1 of this embodiment includes a hard disk controller 11, a servo controller 12, a VCM driver 13, a read/write channel 14, a head preamplifier 15, an electromagnetic wave detection circuit 16, a bus 17, an MPU 18, a memory 19 and an interface 20. Many of the other illustrated members are as described above.

The hard disk drive 1 of this embodiment receives a write instruction from a host apparatus to record data on the magnetic recording medium 2. The hard disk drive 1 also receives a read instruction from the host apparatus to access and send back the data recorded on the magnetic recording medium 2. Input-output of data between the host apparatus and the hard disk drive 1 is performed via an interface 20. The data is transferred via a bus 17 that is connected with the hard disk controller 11, the MPU 18, the memory 19, and the interface 20.

The hard disk controller 11 controls the entire hard disk drive 1 in synergy with the members described hereafter. Control is performed, for instance, according to a control program recorded in advance on the magnetic recording medium 2. The control program is read from the magnetic recording medium 2. for instance by turning on the power of the drive or resetting it, and may be stored in the memory 19. The memory 19 has functions of storing the control program and also buffering the data to be interchanged with the host apparatus. Moreover, the memory 19 includes a volatile RAM (random access memory) and a nonvolatile ROM (read only memory) for storing an initial program. The MPU 18 executes the program and performs various types of processing.

The servo controller 12 performs servo control of the position of the magnetic head 3. It reads with the magnetic head 3 the positional information (servo pattern) recorded in advance on the magnetic recording medium 2, and acquires a current address via the head preamplifier 15, the read/write channel 14, and the hard disk controller 11. The servo controller 12 also generates a signal required for driving the arm 5 a finite difference from a target address and sends the signal to the VCM driver 13. The VCM driver 13 receives the generated signal and subsequently generates and transmits driving currents to the voice coil motor (VCM) 4.

To be more specific, the relative position of the magnetic head 3 to the magnetic recording medium 2 is feedback-controlled by a route comprised of the magnetic head 3, the head preamplifier 15, the read/write channel 14, the hard disk controller 11, the servo controller 12, and the VCM driver 13 as described above. When the magnetic head 3 is controlled on a target track (track following) or a cylinder, it becomes possible to read and write information. Moreover, as the above feedback loop is controlled by an electric system, there is a possibility that the disturbance wave may act as noise and have a bad effect on the feedback loop.

On receiving such an effect, the magnetic head 3 may lose control and become displaced in a position off the target track (off-track). However, as described later, the hard disk drive 1 in this embodiment is configured so that, when such noise occurs, write processing is inhibited. Thus, it is possible to prevent an unintentional erasure of information recorded on an adjacent track or a data record inducing a read error arising from write operation in the off-track state.

The read/write channel 14 controls data reading from the magnetic head 3 or data writing to the magnetic head 3 via the head preamplifier 15. An analog signal from the magnetic head 3 and amplified by the head preamplifier 15 is input to the read/write channel 14 and converted into a digital signal. In addition, the read/write channel 14 generates a read/write gate signal to control read and write operations.

Figure 5:
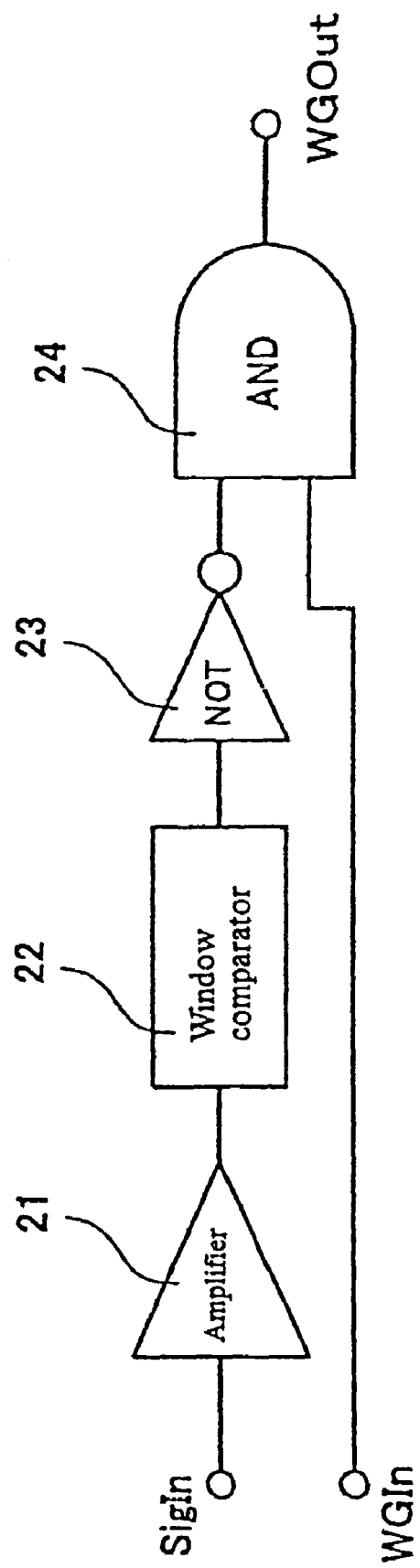
FIG. 5 is a schematic circuit diagram illustrating one embodiment of the electromagnetic wave detection circuit according to the present invention.

The electromagnetic wave detection circuit 16, in one embodiment, detects the potential or electric power of the conductor pattern 7 to determine whether or not there is the disturbance wave (noise). FIG. 5 is a circuit diagram showing an example of the electromagnetic wave detection circuit.

The electromagnetic wave detection circuit 16 of the depicted embodiment comprises an amplifier 21, a window comparator 22, a NOT gate 23 and an AND gate 24. An input signal, SigIn, from the conductor pattern 7 is input to the amplifier 21 and is amplified and subsequently input to the window comparator 22. Moreover, in an alternative embodiment, it is possible to configure the amplifier 21 as an appropriate square circuit and measure the signal from the conductor pattern 7 as electric power.

The window comparator 22 determines whether or not an input signal level exceeds a predetermined threshold, and in the case where the signal exceeds the threshold, the window comparator 22 outputs a High level. In the case where the signal is equal to or lower than the threshold, the window comparator 22 outputs a Low level. The output of the window comparator 22 is inverted at the NOT gate 23 and then is a first input to the AND gate 24.

A write gate signal, WGIn, that is generated by the read/write channel 14 is a second input to the AND gate. The write gate signal, WGIn, is a write enable signal without regard to the possible presence of a disturbance wave. In one embodiment, the write gate signal, WGIn, is generated under the control of the hard disk controller 11. Under normal circumstances, the head 3 is in a track following state when this write gate signal, WGIn, is at the High level. Under these normal circumstances, write processing controlled by the read/write channel may be performed.

In this embodiment, the write gate signal output, WGOut, comes to the High level only when the first and second inputs, SigIn and WGIn, respectively, of the AND gate are both at the High level. In one embodiment, the write gate signal output, WGOut, may be fed back and used as the write gate signal, WGIn, to be actually used for write control. To be more specific, the strength of the disturbance wave is considered in this embodiment so that the write gate signal, WGIn, may become the write gate signal output, WGOut, only in the case where the potential or electric power of the conductor pattern 7 is at or lower than the predetermined threshold (the output of the window comparator is at the Low level), and the write gate signal output, WGOut, does not reach the High level even if the write gate signal, WGIn, is at the High level in the case where the potential or electric power from the conductor pattern 7 exceeds the threshold. To be more specific, the write gate signal output, WGOut, inhibits write processing in the case where the disturbance wave exceeds the predetermined threshold.

Figure 6:
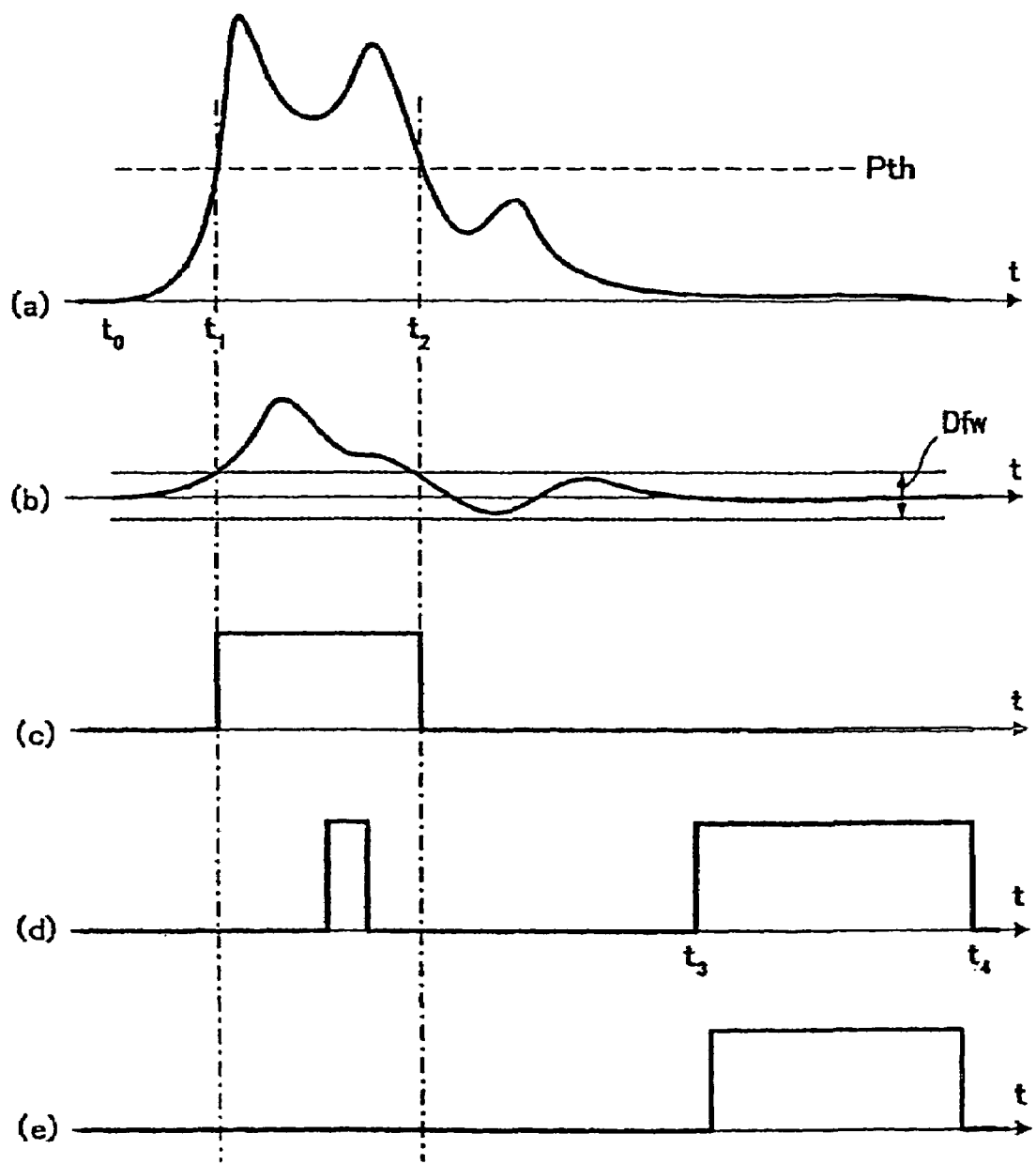
FIG. 6 is a timing chart showing electric power or voltage over time at a section in the electromagnetic wave detection circuit of FIG. 5.

FIG. 6 is a timing chart showing electric power or voltage at one section in the circuit diagram in FIG. 5. Waveform A is a power waveform showing an example of a disturbance signal from the conductor pattern 7, and waveform B is a graph showing the displacement of the head position from the track center over time. In addition, waveform C is a graph showing the output of the window comparator 22, waveform D is a graph showing an example of the write gate signal, WGIn, and waveform E is a graph showing the resulting write gate signal output, WGOut.

As illustrated, the electric power of the disturbance wave shown in waveform A is small in amplitude at an initial time t0 and so the head position in the track following state is almost stable at the track center as shown in waveform B at the time t0. However, the electric power detected from the conductor pattern 7 becomes larger at time t1 due to an increase in the disturbance wave. I If the power from the conductor pattern 7 exceeds a predetermined threshold, Pth, as shown at the time t1, the displacement of the head position from the track center becomes so significant, due to disorder of the servo system caused by the disturbance wave, that it exceeds a displacement range, Dfw, that can be regarded as track following. If in such a state, the output of the window comparator 22 shown in waveform C comes to the High level and is subsequently converted to a Low level by the NOT gate 23, the write gate signal output, WGOut, does not reach the High level, even if the write gate signal, WGIn, is at the High level. In general, the write processing is inhibited.

On the other hand, if the strength of the disturbance wave becomes weaker at a time t2, as shown in waveform A, the signal power from the conductor pattern 7 becomes lower than the predetermined threshold, Pth and the output of the window comparator 22 comes to the Low level, as shown in waveform C. If the write gate signal, WGIn, comes to the High level in this state, such as at a time t3, the write gate signal output, WGOut, also comes to the High level so that the actual write processing is enabled.

It is possible, by adopting such a configuration, to keep from write processing when the disturbance wave is strong and prevent the write processing in the state where the servo system is disturbed and in an off-track state. Consequently, it is possible to prevent an overwrite to an adjacent track or data recording between tracks.

Figure 7:
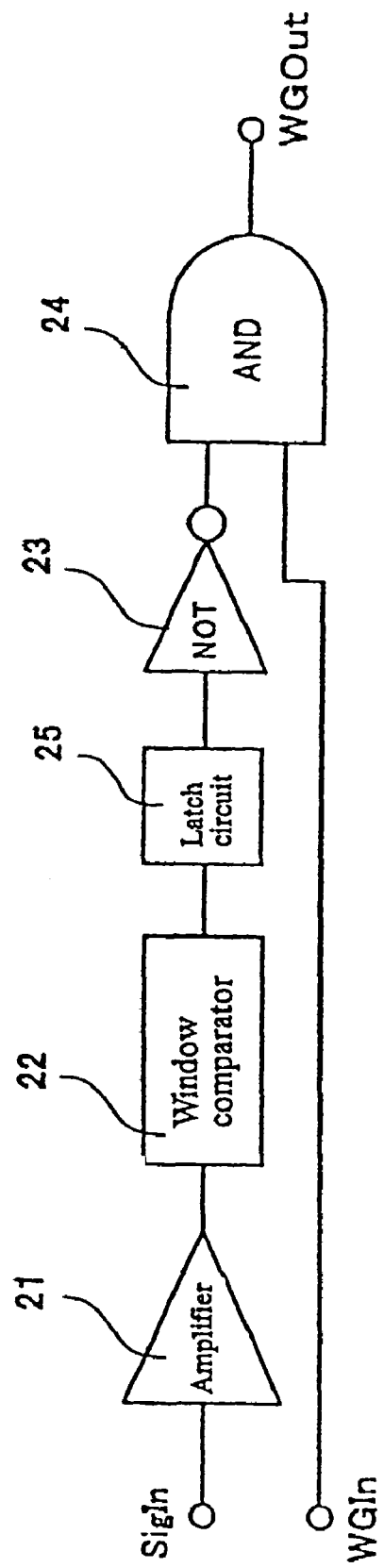
FIG. 7 is a schematic circuit diagram illustrating another embodiment of the electromagnetic wave detection circuit according to the present invention.

Moreover, while the above example of the electromagnetic wave detection circuit 16 shows a case of measuring the disturbance wave as electric power, the output of the window comparator 22 can be latched by an appropriate latch circuit 25, as shown in FIG. 7, in the case of measuring the disturbance wave in terms of voltage (or current) or in the case of a fiercely changing signal that crosses the threshold many times in a very short time. By adding the latch circuit 25 to the electromagnetic wave detection circuit 16, the latch circuit 25 may be configured to hold the output signal from the window comparator 22 at a High level for a delay time before allowing the output signal from the window comparator 22 to return to a Low level. FIG. 7 is a circuit diagram showing another example of the electromagnetic wave detection circuit 16 including the latch circuit 25, provided that, in one embodiment, the latch circuit 25 is reset after a predetermined time has elapsed.

Figure 8:
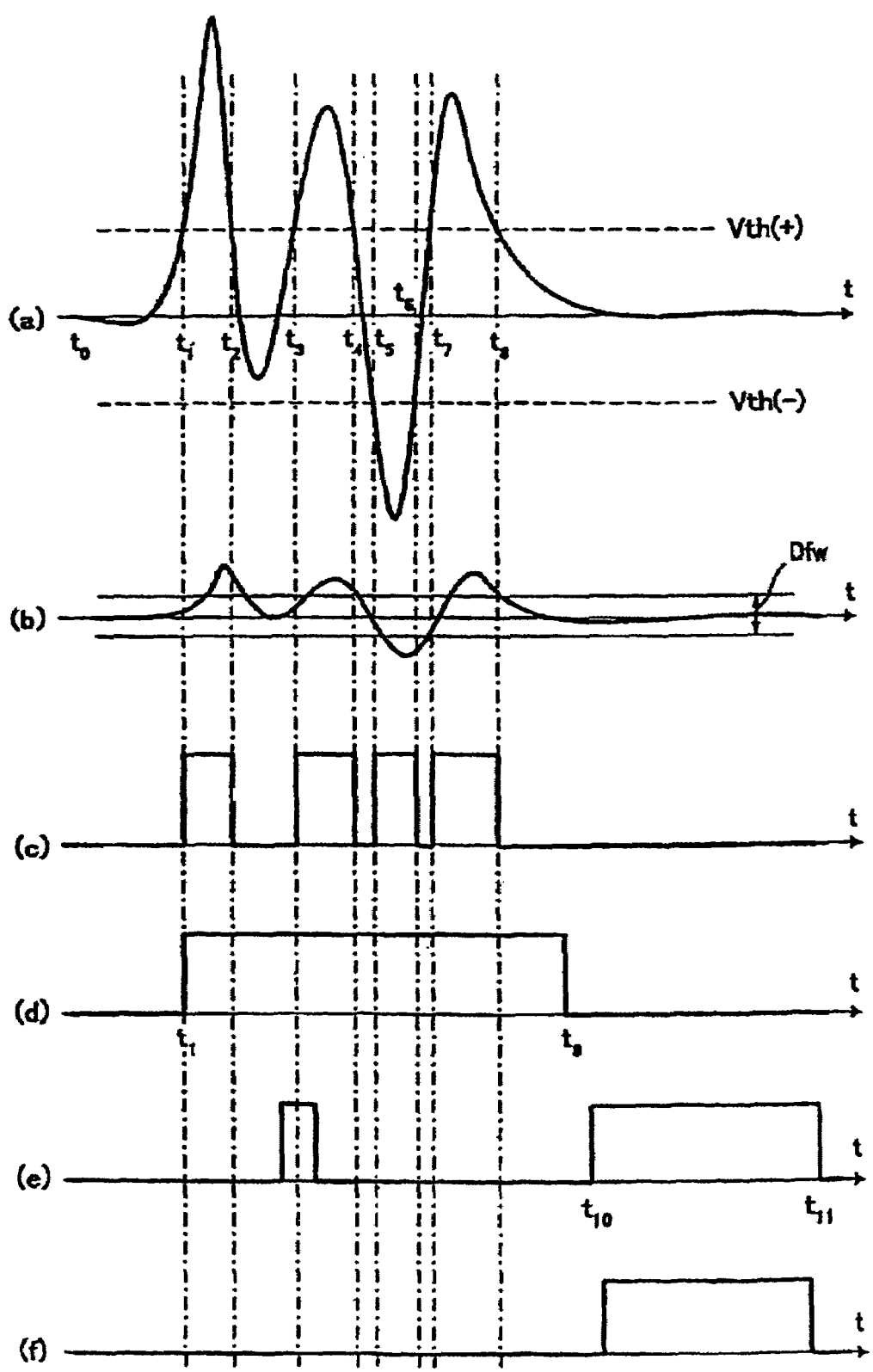
FIG. 8 is a timing chart showing voltage (or a current) at a section in the electromagnetic wave detection circuit of FIG. 7.

FIG. 8 is a timing chart showing voltage (or corresponding current) of one section, such as the main section, in the circuit diagram in FIG. 7. Waveform A is a waveform showing an example of a voltage (or a current) signal (disturbance wave) from the conductor pattern 7. Waveform B is a graph showing the displacement of the head position from the track center over time. In addition, waveform C is a graph showing the output of the window comparator 22, waveform D is a graph showing the output of the latch 25, waveform E is a graph showing an example of the write gate signal, WGIn, and waveform F is a graph showing the resulting write gate signal output, WGOut.

As illustrated in waveform A, the signal from the conductor pattern 7 is an AC signal in the case of measuring it as voltage. Thus, while the disturbance wave is strong, the voltage fiercely alternates back and forth between the thresholds Vth(+) and Vth(−). In addition, even a power signal may cross the threshold Pth frequently when the signal drastically changes. Thus, as shown in waveform C, there is a period when the output of the window comparator 22 is at the Low level even during the intermediate times between time t1 and time t8 when the disturbance wave is strong.

It is possible to output a High level in a stable manner during the times t1 to t9, as shown in waveform D, by using the latch circuit 25 that maintains the High level input for an appropriate length of time. Moreover, while the problem of the disturbance wave is solved during the times t8 to t9, the High level output may be maintained by the latch. This period can also be utilized as a period required for stabilizing the servo system disorder due to the disturbance wave. This allows write processing of higher reliability.

For example, if the write gate signal is at a High level, such as at approximately time t3 on waveform E, while the output from the window comparator 22 is low Oust prior to time t3 ), the latch circuit 25 maintains a High level output and precludes enablement of write processing during the transition time at approximately time t3. In this scenario, the write gate signal output remains at a Low level, as shown in waveform F, inhibiting write processing at a time when the write head may be displaced from the track center. The latch circuit 25 may return the output to a Low level after the disturbance wave and/or head displacement have stabilized within respective thresholds, such as at time t9, and enable write processing upon receipt of a subsequent write gate signal, such as between times t10 and t11.

While the above description concretely described the invention and experiments conducted by the inventors based on one embodiment, the present invention is not limited to the above described embodiment and can be modified in various ways to the extent that it is not deviated from its abstract, purpose, and function.

Figure 9A:
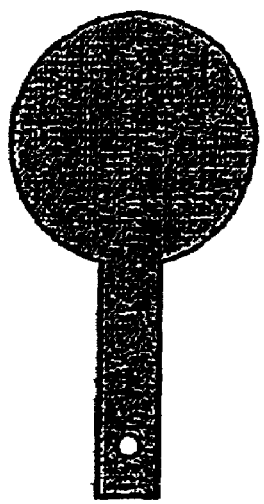
FIGS. 9a through 9e are schematic diagrams illustrating distinct plan views of several embodiments of the conductor pattern according to the present invention.
Figure 9B:
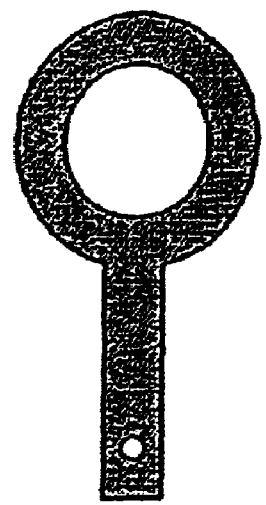
Figure 9C:
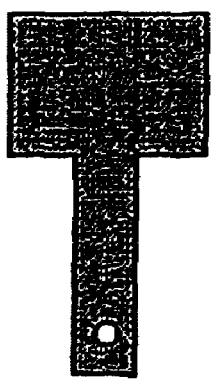
Figure 9D:
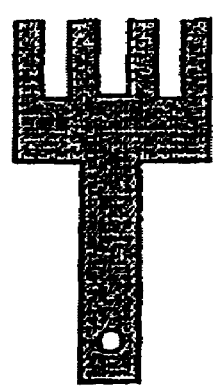
Figure 9E:
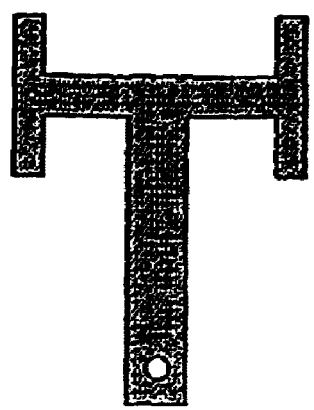

For instance, a shape shown in FIG. 3 was illustrated as the conductor pattern 7 in the above described embodiment. However, the present invention is not limited to what is configured by such a square area portion 7a and a linear portion 7b, but it may also be configured by a circle area portion 7a and a linear portion 7b as shown in FIG. 9A. In addition, the area portion 7a may also be a doughnut or ring shape as shown in FIG. 9B. Furthermore, the area portion 7a may be a rectangle as shown in FIG. 9C, a comb as shown in FIG. 9D, an H-shape as shown in FIG. 9E, an I-shape or U-shape, or another arbitrary shape having a width, La, that is larger than the width, Lb, of the linear portion. Furthermore, a linear pattern such as a dipole, a folded antenna pattern, a waveform linear pattern, and so on may also be used as the conductor pattern 7.

Likewise, the shape of the additional portion 7c may vary and may depend in part on the shape and size of the conductor pattern 7, the distance of the additional portion 7c from the conductor pattern 7, the location and orientation of the additional pattern relative to a hard disk drive 1, and so forth.

Moreover, while the above described embodiment shows an example of using the conductor pattern 7 for detecting the electromagnetic wave, it is also possible to provide an antenna separately and use it for detecting the disturbance electromagnetic wave. In this case, the antenna should preferably be provided close to a casing of the hard disk drive. In the case of providing an antenna separately, there is a merit of detecting the disturbance wave with higher sensitivity by allowing fine adjustments of the placement position.

In addition, an example where wiring is formed in the same layer as the conductor pattern 7 is described in the above described embodiment. To be more specific, it is an example of providing wiring in a wiring area 8 around the conductor pattern 7. However, it is possible to render as a grounding pattern all the wiring area 8 in the same layer as the conductor pattern 7. While an additional layer may become necessary separately by utilizing multilayer interconnection, it is possible to reduce the effect of the disturbance wave on the servo system by forming the grounding pattern almost in its entirety. The present invention implements reliable write processing even in the circumstances of the disturbance wave, and it can implement further reliable write processing by a synergistic effect with a shield effect of the above described grounding pattern. Moreover, it is also feasible to render such a grounding pattern as a shield of the wiring comprising the servo system by separately providing a printed wiring board 6.

Furthermore, the above described embodiment shows an example of adopting the present invention to a hard disk drive 1. However, it is possible to apply the present invention to apparatuses having a rotary recording medium such as a writable optical or optical magnetic storage such as CD-R/W, DVD, and MO, and so on. The invention is also applicable to removable rotary magnetic storage devices, such as a ZIP apparatus or a floppy disk drive.

In the case of an apparatus wherein optical writing rather than magnetic writing of information is performed to the rotary recording medium, writing means may be an oscillator of a laser beam or a portion having an objective lens section for irradiating the laser beam. In addition, the writing means is not limited to the ones moved by the arm, such as the hard disk drive 1, but may include those writing means configured to linearly move on a rail.

Moreover, the present invention can be utilized for control of a robotic arm requiring accurate positioning, for instance, other than for inhibiting off-track action in the information writing operation of the rotary recording device. To be more specific, while operation for inhibiting the information writing operation is performed in the case of detecting the electromagnetic wave at a problematic level in a storage recording medium, it is also possible to utilize the present invention for such operation as to interrupt or stop work performed by the robotic arm in such a case.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for inhibiting an erroneous control signal due to a disruptive electromagnetic signal, the apparatus comprising:
    a control module configured to generate a control signal for controlling a controlled device, wherein the controlled device comprises an electronic storage recording device and the control signal comprises a write signal for writing to a recording medium within the electronic storage recording device:
    a detection module configured to detect a disruptive electromagnetic signal within a region near the controlled device; and
    a control gate module configured to determine if the disruptive signal is greater than a threshold value and to inhibit the control signal from reaching the controlled device when the disruptive electromagnetic signal is determined to be greater than the threshold value.

2. The apparatus of claim 1, wherein the detection module comprises an antenna.

3. The apparatus of claim 2, wherein the antenna comprises a conductor pattern on a printed wiring board.

4. The apparatus of claim 3, wherein the conductor pattern comprises a linear region and an area region, the linear region being linear in shape having a first length and a first width and the area region being non-linear in shape having a second length and a second width.

5. The apparatus of claim 2, wherein the antenna comprises an additional portion that is electrically separate and configured to provide a ground potential.

6. The apparatus of claim 1, wherein the detection module is configured to detect a level of the disruptive electromagnetic signal selected from a group consisting of a power level, a voltage level, and a current level.

7. The apparatus of claim 1, wherein the detection module is located within an enclosure of the electronic storage recording device.

8. The apparatus of claim 1, wherein the electronic storage recording device comprises a hard disk drive having a magnetic disk recording medium and a magnetic write head.

9. The apparatus of claim 1, wherein the control gate module comprises a latch module configured to maintain for a selected delay time an electrical signal designating the presence of the disruptive electromagnetic signal when the disruptive electromagnetic signal is determined to be greater than the threshold value.

10. The apparatus of claim 1, wherein the controlled device comprises a robotic module configured to mechanically move a robotic device.

11. A system for inhibiting an erroneous control signal due to a disruptive electromagnetic signal, the system comprising:
    a control device configured to generate a control signal for controlling a controlled device, wherein the controlled device comprises an electronic storage recording device and the control signal comprises a write signal for writing to a recording medium within the electronic storage recording device;
    a detection module having an antenna located near the controlled device, the detection module configured to detect a level of a disruptive electromagnetic signal within a region near the controlled device;
    a control gate module configured to determine if the disruptive signal is greater than a threshold value and to inhibit the control signal from reaching the controlled device when the disruptive electromagnetic signal is determined to be greater than the threshold value; and
    a latch module configured to maintain, for a delay time, an electric signal designating the presence of the disruptive electromagnetic signal when the disruptive electromagnetic signal is determined to be greater than the threshold value.

12. A system for inhibiting an erroneous write signal due to a disruptive electromagnetic signal, the system comprising:
    an electronic storage recording medium;
    an electronic storage recording device located within an enclosure and having an electronic storage write head configured to store data on the electronic storage medium;
    a write control module configured to generate a write signal for writing that data to the electronic storage recording medium;
    a detection module having a conductor pattern located on a printed wiring board within the enclosure, the detection module configured to detect a disruptive electromagnetic signal within a region near the electronic storage write head and electronic storage recording medium; and a write gate module configured to determine if the disruptive signal is greater than a threshold value and to inhibit the write control signal from reaching the electronic storage write head when the disruptive electromagnetic signal is determined to be greater than the threshold value.

13. The system of claim 12, wherein the electronic storage recording device comprises a hard disk drive and the electronic storage write head comprises a magnetic write head.

14. A process for inhibiting an erroneous control signal due to a disruptive electromagnetic signal, the process comprising:

generating a control signal for controlling a controlled device, wherein the controlled device comprises an electronic storage recording device and the control signal comprises a write signal for writing to a recording medium within the electronic storage recording device;

detecting a disruptive electromagnetic signal within a region near the controlled device;

determining if the disruptive signal is greater than a threshold value; and inhibiting the control signal from reaching the controlled device when the disruptive electromagnetic signal is determined to be greater than the threshold value.

15. The process of claim 14, wherein detecting a disruptive electromagnetic signal comprises detecting the electromagnetic signal using an antenna in the form of a conductor pattern on a printed wiring board.

16. The process of claim 14, wherein detecting a disruptive electromagnetic signal comprises detecting a level of the disruptive electromagnetic signal selected from a group consisting of a power level, a voltage level, and a current.

17. The process of claim 14, further comprising maintaining for a selected delay time an electrical signal designating the presence of the disruptive electromagnetic signal when the disruptive electromagnetic signal is determined to be greater than the threshold value.

18. A process for inhibiting an erroneous control signal due to a disruptive electromagnetic signal, the process comprising:

generating a control signal for controlling a controlled device, wherein the controlled device comprises an electronic storage recording device and the control signal comprises a write signal for writing to a recording medium within the electronic storage recording device;

detecting a disruptive electromagnetic signal within a region near the controlled device using an antenna in the form of a conductor pattern on a printed wiring board;

determining if the disruptive signal is greater than a threshold value;

maintaining an electrical signal for a selected delay time, the electrical signal designating the presence of the disruptive electromagnetic signal when the disruptive electromagnetic signal is determined to be greater than the threshold value; and inhibiting the control signal from reaching the controlled device when the disruptive electromagnetic signal is determined to be greater than the threshold value.

19. A computer readable storage medium comprising computer readable code configured to carry out a process for inhibiting an erroneous control signal due to a disruptive electromagnetic signal, the process comprising:

generating a control signal for controlling a controlled device, wherein the controlled device comprises an electronic storage recording device and the control signal comprises a write signal for writing to a recording medium within the electronic storage recording device;

detecting a disruptive electromagnetic signal within a region near the controlled device;

determining if the disruptive signal is greater than a threshold value; and inhibiting the control signal from reaching the controlled device when the disruptive electromagnetic signal is determined to be greater than the threshold value.

20. An apparatus for inhibiting an erroneous control signal due to disruptive electromagnetic signal, the apparatus comprising:

means for generating a control signal for controlling a controlled device, wherein the controlled device comprises an electronic storage recording device and the control signal comprises a write signal for writing to a recording medium within the electronic storage recording device;

means for detecting a disruptive electromagnetic signal within a region near the controlled device;

determining if the disruptive signal is greater than a threshold value; and means for inhibiting the control signal from reaching the controlled device when the disruptive electromagnetic signal is determined to be greater than the threshold value.

* * * * *